(12) United States Patent
Günther et al.

(10) Patent No.: US 12,237,528 B2
(45) Date of Patent: Feb. 25, 2025

(54) BATTERY HOUSING COMPRISING A SPACER

(71) Applicant: Kirchhoff Automotive Deutschland GmbH, Attendorn (DE)

(72) Inventors: Alexander Günther, Olpe (DE); Maria Schmitt, Attendorn (DE); Dominik Ax, Finnentrop (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 460 days.

(21) Appl. No.: 17/636,955

(22) PCT Filed: Sep. 7, 2020

(86) PCT No.: PCT/EP2020/074951
§ 371 (c)(1),
(2) Date: Feb. 21, 2022

(87) PCT Pub. No.: WO2021/048053
PCT Pub. Date: Mar. 18, 2021

(65) Prior Publication Data
US 2022/0278415 A1    Sep. 1, 2022

(30) Foreign Application Priority Data

Sep. 9, 2019 (DE) .................... 10 2019 124 060.3
Sep. 9, 2019 (DE) .................... 10 2019 124 061.1

(51) Int. Cl.
*H01M 50/291* (2021.01)
*B60K 1/04* (2019.01)
(Continued)

(52) U.S. Cl.
CPC ............ *H01M 50/291* (2021.01); *B60K 1/04* (2013.01); *H01M 50/24* (2021.01);
(Continued)

(58) Field of Classification Search
CPC ... B60K 1/04; B60K 2001/0438; B60L 50/64; H01M 50/20; H01M 50/24;
(Continued)

(56) References Cited

U.S. PATENT DOCUMENTS

| 10,424,770 B2 | 9/2019 | Gunther |
| 10,723,234 B2 | 7/2020 | Gunther |

(Continued)

FOREIGN PATENT DOCUMENTS

| CN | 104712746 A | 6/2015 |
| CN | 109890632 A | 6/2019 |

(Continued)

OTHER PUBLICATIONS

Examination report dated May 1, 2024 in related Chinese application No. 202080062794.8.
(Continued)

*Primary Examiner* — Victoria H Lynch
(74) *Attorney, Agent, or Firm* — Polson Intellectual Property Law P.C.; Margaret Polson; Christopher Sylvain

(57) ABSTRACT

A battery housing for a motor vehicle comprising a base part having a base plate and a cover part with a cover plate. The base part and the cover part delimit an accommodation volume for accommodating at least one battery module. The plates are spaced apart by at least one spacer arranged inside the receiving volume and supported on both plates, in that the spacer is supported on at least one of the two plates with its end face. In the region of this support, the plate has an opening. The end face of the spacer extends circumferentially over the edge of the opening in the radial direction inward projecting into the plane of the support of the end face on the plate. The spacer is fastened on this plate.

12 Claims, 3 Drawing Sheets

(51) Int. Cl.
   *H01M 50/24*    (2021.01)
   *H01M 50/249*   (2021.01)
   *H01M 50/262*   (2021.01)
   *H01M 50/271*   (2021.01)

(52) U.S. Cl.
   CPC ....... *H01M 50/249* (2021.01); *H01M 50/262* (2021.01); *H01M 50/271* (2021.01); *B60K 2001/0438* (2013.01)

(58) Field of Classification Search
   CPC ............ H01M 50/249; H01M 50/262; H01M 50/271; H01M 50/291; Y02E 60/10
   See application file for complete search history.

(56) References Cited

U.S. PATENT DOCUMENTS

| | | | |
|---|---|---|---|
| 10,763,472 | B2 | 9/2020 | Gunther et al. |
| 10,843,577 | B2 | 11/2020 | Gunther et al. |
| 10,985,422 | B2 | 4/2021 | Gunther et al. |
| 11,075,416 | B2 | 7/2021 | Günther |
| 11,108,112 | B2 | 8/2021 | Gunther et al. |
| 11,205,816 | B2 | 12/2021 | Gunther |
| 2020/0295322 | A1 | 9/2020 | Gunther |
| 2021/0143497 | A1 | 5/2021 | Günther |
| 2021/0265690 | A1 | 8/2021 | Günther |
| 2021/0384581 | A1 | 12/2021 | Gundogan et al. |
| 2022/0278400 | A1 | 9/2022 | Gündogan |
| 2022/0294071 | A1 | 9/2022 | Günther |
| 2023/0006297 | A1 | 1/2023 | Günther |

FOREIGN PATENT DOCUMENTS

| | | |
|---|---|---|
| DE | 102015007960 A1 | 12/2016 |
| DE | 102016214289 A1 | 2/2018 |
| DE | 102017100612 A1 | 7/2018 |
| DE | 102018211471 B3 | 9/2019 |
| WO | 2021048051 A1 | 3/2021 |
| WO | 2021048053 A1 | 3/2021 |

OTHER PUBLICATIONS

Examination report dated Dec. 7, 2023 in related Chinese application No. 202080062794.8.
Examination report dated Jun. 29, 2023 in related Chinese application No. 202080062794.8.
International Search Report dated Mar. 18, 2021 in parent International application PCT/EP2020/047951.
Written Opinion of the International Searching Authority dated Mar. 18, 2021 in parent International application PCT/EP2020/047951. Note: Machine translation provided. Consult official WIPO translation if unclear.
Examination Report dated May 15, 2020 in related German application DE 10 2019 124 060.3. Machine translation provided.
Examination report dated Oct. 11, 2024 in related German application No. 10 2019 124 060.3.

BATTERY HOUSING COMPRISING A SPACER

BACKGROUND

The present disclosure relates to a battery housing for a motor vehicle, comprising a base part having a base plate and a cover part having a cover plate, wherein the base part and the cover part delimit an accommodation volume for accommodating at least one battery module and wherein the plates are spaced apart by at least one spacer arranged inside the accommodation volume and supported on both plates, in that the spacer is supported on at least one of the two plates with its end face and wherein this plate has an opening in the region of this support, wherein the end face of the spacer extends circumferentially over the edge of the opening in the radial direction inwards projecting into the plane of support of the end face on the plate and the spacer is fastened on this plate, wherein the spacer has an internal thread introduced into its end face and is fastened on the plate using a screw connection engaging in the internal thread and acting against the outside of the plate.

Battery housings are used for electric vehicles and hybrid vehicles in order to accommodate therein batteries or battery modules, which are required for electrically driving the vehicle. Such batteries are typically high-performance batteries and are divided into several modules. Due to the high energy density, special safety standards have to be observed with regard to the fastening of the battery housing on the motor vehicle and the strength and rigidity of the battery housing. The requirements in this regard are quite considerable, especially in view of the weight of 700 kg to be accommodated.

Due to their high weight, the battery modules are preferably arranged in the floor region of a motor vehicle, wherein a planar arrangement is preferred for uniform weight distribution so as not to impair the driving behavior of a vehicle. In such an arrangement, multiple battery modules are arranged adjacent to one another in a flat configuration. In many cases, the battery housing occupies a large part of the underfloor region of a motor vehicle.

Such a battery housing is composed of a base part and a cover part. Both parts each comprise a plate that represents the base area of the battery housing and determines the planar extension of the accommodation volume of the battery housing. Both plates are connected to one another at their edges via side walls, wherein these side walls can be part of the base part and/or the cover part. A plate carrying such side walls forms a trough. The trough structure can be provided by forming a blank and thus provided in one piece. In other configurations, the trough is composed of the plate and a frame profile, typically made of extruded profiles. Both parts—base part and cover part—are connected to one another in a circumferentially sealed manner, for example via a screw connection or by adhesively bonding the two parts to one another. For the purpose of the connection, these have a circumferential, outward-oriented mounting flange. The seal can be effectuated by a solid seal, sealing compound, or an adhesive. The seal is typically designed to be gas, water, and dust tight.

The battery housing assembled from the base part and the cover part encloses an accommodation volume in which battery modules can be accommodated. This storage volume is delimited by the inside surfaces of the base plate, the cover plate, and the side walls.

Against the background of the high weight of the battery modules, the typically large surface extension of the battery housing, and the requirement for the battery housing to be rigid, it is sometimes necessary to support the base plate in relation to the cover plate and to clamp both plates against one another in order to avoid opposing vibrations and to distribute introduced forces uniformly.

DE 10 2017 100 612 A1 discloses a sleeve-shaped spacer for a battery housing. This spacer is arranged in the accommodation volume enclosed by the battery housing and is supported between the base plate and the cover plate. The base plate and the cover plate each have an opening in the region where the spacer is supported, so that a threaded bolt can be inserted through the base plate, the sleeve-shaped spacer, and the cover plate. The spacer has an extension that reaches through the opening in the base plate. The screw head of the threaded bolt is supported on this end face or terminating face of the spacer, which is spaced apart from the outside of the base plate. The screw head is supported here on a distal end of the spacer inserted through the base plate. The spacer projecting through the base plate is welded to the base plate. The other end of the screw shaft projects out of the opening in the cover plate with a screw-threaded section. This screw-threaded section is used for fastening the battery housing on the vehicle side. The cover plate is clamped against the spacer when the threaded bolt is tightened in the vehicle-side anchor. The purpose of the spacer is to prevent the base from being deformed when the threaded bolt is tightened. The design of the spacer having its section protruding from the base part is also used for this purpose, on which the screw head is supported, so that the force introduced by the threaded bolt head acts exclusively on the spacer.

DE 10 2018 211 471 B3 discloses a spacer in which a plate is clamped between a spacer and a sleeve inserted into this spacer. To seal this fastening, a seal ring is provided between the sleeve and the outside of the plate and a thread seal is provided between the internal thread of the spacer and the external thread of the sleeve.

In this previously known design, there are several problem areas: on the one hand, when the battery housing is not installed on a vehicle, the cover is loose in the region of the spacer and is therefore not leak-tight. On the other hand, there is a desire for an underfloor construction that is as level as possible, so that if the vehicle touches down, any protruding components cannot be damaged or even knocked off. Finally, with this previously known battery housing, problems result with respect to the tolerance of the base part to the cover part, since due to the dimensions of the openings, the aligned position of base part, spacer, and cover part has to be ensured for proper assembly. Due to the size of the components, this is only implementable with a corresponding amount of effort.

SUMMARY

Against this background, one object of the present disclosure is to improve a battery housing according to the prior art mentioned at the outset with respect to at least some of the aspects discussed above.

This is achieved by a generic battery housing of the type mentioned at the outset and having the features of claim 1.

The at least one spacer of this battery housing is supported on at least one plate, namely the cover part and/or the base part, using its end face formed by its material. The spacer thus stands on the inside on the plate to be supported. In one embodiment, this support can be provided directly, so that the end face contacts the plate. In another embodiment, a seal, for example an O-ring, is arranged between the end face and the plate. Such a seal can be arranged in a groove on the face of the spacer for easy assembly.

In the region of the spacer, the plate, which is supported on the face of the spacer, has an opening. The geometry of the end face of the spacer and that of the opening are matched to one another in such a way that the end face supported on the inside of the plate extends over the edge of the opening. Thus, the end face projects beyond the edge of the opening towards the center of the opening. Thus, the spacer is supported only with a part of its end face on the inside of the plate. Another part of its end face protrudes beyond the edge of the opening.

Extremely simple and effective tolerancing of the spacer in relation to the plate to be supported is implemented by this configuration. The spacer can be displaced to the extent that its end face, in the plane of its support on the plate in the direction of the center of the opening, protrudes into the latter, for correct positioning in relation to the plane of the plate and thus for tolerance compensation in the plane of the support. The end face of the spacer thus also represents a tolerance compensation surface with regard to the support of the spacer on the plate. A special feature is that this is possible due to the extensive support, without having to accept leaks or undercuts. The outer shape of the end face preferably corresponds to the shape of the opening. This provides optimum utilization of the available surface for tolerance compensation. The spacer can be made solid or also as a sleeve. If the spacer is made having an end face provided by a sleeve section, the end face is to be understood as that surface which is provided by the material of the sleeve.

In the context of this description, if an opening in the plate in the support region of the end face of the spacer is mentioned, this opening can also be provided by a plurality of openings, typically arranged in a grid. In such a case, the enclosing lateral surface of these openings can represent the edge over which the end face of the spacer extends.

In one preferred embodiment, the spacer is a sleeve body. By using a sleeve body, the plate can be supported over a larger region at the same weight without the spacer becoming too heavy. If such a spacer is continuously embodied as a sleeve body, the battery housing can be fastened on the vehicle side by means of a threaded bolt that reaches through the spacer with its shaft.

The spacer is fastened on the supported plate.

The spacer is screwed to the plate. For this purpose, the spacer has an internal thread opening into its end face supported on the plate. A screw connector can be screwed into this internal thread. The plate is arranged between the screw head and the end face of the spacer, so that the spacer clamps the plate from the inside and the screw head clamps the plate from the outside when the screw connector is tightened. In this configuration, a seal can be attached between the outside of the plate and the screw head, for example in the form of an O-ring. Of course, in addition to the above-mentioned solid seal, a sealing compound can also be used as a seal at this point. Such an external seal has the advantage that any environmental influences not only cannot penetrate into the battery housing, but are also kept out of the threaded region. This facilitates disassembly, which may have to be carried out under certain circumstances, since corrosion problems between the meshing threads are avoided. It is also possible to seal the thread.

The screw connector can be a threaded bolt, for example. In another embodiment, the screw connector is a screw sleeve. In such an embodiment, the sleeve has a support flange at the end that protrudes radially outward and represents the screw head of such a screw connector. The use of a sleeve results in additional possibilities: If the spacer itself is a sleeve, the freedom of movement created in this way can be used for dissipating heat arising within the accommodation volume. Such a screw connector embodied as a sleeve body can have an internal thread for fixing. Then, the battery housing can be fastened on the vehicle side by screws which are inserted from the vehicle side. In such an embodiment, there are no elements protruding from the lower side of the base part, despite the screw connection.

In one preferred embodiment, the spacer is made of a metal, in particular steel or a light metal. Typically, the same material will be used as the material for the spacer as for the implementation of the base part and the cover part. There are then no tensions between the components as a result of thermally induced longitudinal expansion. In addition, problems of galvanic corrosion are avoided.

The above-described spacer can be displaced with respect to its position relative to the plate to be supported, without this resulting in disadvantages in terms of load-bearing capacity or assembly options. At the same time, it is possible to provide an opening in the plate at the position of a spacer, which opening can be easily and securely sealed off from the accommodation volume by the spacer, and in particular can also be made gas-tight. The described support of the spacer on the base plate or the cover plate is already leak-tight and protected from any environmental influences in the delivery state of a battery housing.

It is apparent that the spacer can be supported on the other plate in the same way. There is certainly also the possibility of conceiving the support on the other plate differently. If the support arrangement described is located, for example, on the cover plate, the support on the then opposite base plate can be provided either by the spacer itself or by a strut inserted into the trough structure of the base part, on which a spacer element is placed. Then the spacer is formed from the strut and the spacer element, which is placed on the top side of the strut.

The attachment of the spacer to the other plate can also be characterized in that, in the region of this support, the corresponding plate has an opening and the spacer has an insertion section which protrudes into the opening and at least partially presses with its lateral surface on the lateral surface of the opening, wherein the spacer is fastened to this plate, and wherein the insertion section protrudes into the opening at most far enough for its terminating face to terminate flush with the outside of the plate.

The concept of the insertion section used in the context of the following descriptions is that section of the spacer which, starting from the plane of the inside of the plate, protrudes into the opening.

The spacer arranged in the battery housing does not protrude from the opening of the other plate on the outside. Advantageously, this means that the terminating face formed by the material of the spacer is arranged within the opening, wherein at the same time parts of the spacer are prevented from protruding out of the plate, on which this support arrangement is embodied, from the battery housing.

The insertion section preferably presses with its outer lateral surface at least in sections on the lateral surface of the opening. By contacting the two lateral surfaces, a form fit acting in the plane of the plate is formed between the spacer and the base plate. A stop is provided by the opening. This simplifies the positioning of the spacer on the plate to be supported. The insertion section preferably has the same cross-sectional geometry as the opening. The lateral surface of the insertion section can then press circumferentially against the lateral surface of the opening. An embodiment is also conceivable in which the lateral surface of the insertion section is supported in at least two regions on the lateral surface of the opening. Such support is sufficient to ensure alignment of the spacer to simplify the assembly.

The spacer is fastened on the plate in order to ensure pressure-resistant and tension-resistant support in the axial direction of the spacer. In one preferred embodiment, such a fastening can be formed in a materially-bonded or form-fitting manner.

In a first embodiment, the terminating face of the insertion section of the spacer facing toward the outside of the plate is materially bonded to the plate. In this way, the spacer can be materially bonded to the plate from the outside. In principle, joining on the inside is not required. The welding process is typically carried out as a MIG, MAG, or laser welding process. The arc is typically ignited on the more massive component. This can be the base plate if it has a greater material thickness than the spacer. However, in many cases the arc can be ignited on the terminating face of the insertion section of the spacer. In this way, the weld pool is formed during the welding process first on the terminating face, namely by melting the material of the spacer. This melt connects to the hole edge regions of the opening when the melt extends to them. As a result, the hole edge region is typically also melted or partially melted, but without an arc being directed onto the plate, which is generally thinner than the material of the spacer available for the intended weld. The risk of accidental burnout is effectively prevented in this way. In the welded connection, the center of the resulting weld seam is on the terminating face. It was recognized that by using the material provided by the spacer to form a weld seam, a possible welding distortion in the battery housing, in particular in relation to the plate, can be reduced, so that greater process reliability, which also has a positive effect on the leak-tightness of the battery housing, is provided. Otherwise, the arc acts in the direction of the axial extension of the spacer and thus in a direction in which unintentional burning through, in particular of a thin-walled base plate, cannot occur.

It is also possible for the insertion section to only partially protrude into the opening of the plate, so that its terminating face does not terminate flush with the outside of the plate, but is located inside the opening. As a result, the terminating face of the insertion section, together with the lateral surface of the opening, forms a step in which a weld seam can be placed as a fillet seam. In such a configuration, the terminating face of the insertion section is connected by material bonding to the lateral surface of the opening.

Due to the materially-bonded connection between the spacer and the plate, the spacer is supported on the plate in the axial direction. If the weld is circumferential and continuous, the connection is also leak-tight, in particular gas-tight.

In order to achieve a uniform heat introduction during the welding process, the lateral surface of the spacer is aligned with the opening in the region of the transition from the spacer to the plate, without the spacer having a projection that presses against the inside of the plate. This avoids excessive heat introduction into the plate.

In an alternative embodiment, which can also be used in addition to the above-described embodiment, the spacer is connected to the plate via a form fit, in particular in the form of a screw connection to the plate. For this purpose, the spacer has a support surface contacting the plate inside, for example via a step, and an internal thread introduced into its terminating face. The spacer is fastened on the plate by means of a screw connection which engages in the internal thread and acts with a head or collar against the outside of the plate. A screw connection is particularly advantageous if the base part is to be separated from the cover part for dismantling purposes. At the same time, it is ensured by means of the screw connection, which is independent of additional assembly steps, that the battery housing can also be designed to be leak-tight, typically gas-tight, during transport.

The screw connection can take place by means of a sleeve which has an external thread meshing with the internal thread of the spacer in a section of its outer lateral surface and has a collar which acts against the outside of the plate. It is apparent that the collar, at least in sections, has a larger diameter than the smallest diameter of the opening in the plate. Positioning aids on the side of the vehicle body can engage in the sleeve. The weight of the battery housing is also reduced in this way.

The sleeve can additionally be designed as an internally threaded sleeve, so that the battery housing can be fastened to the body of the vehicle by means of a screw connection engaging in the internal thread of the sleeve. Such a configuration opens up the possibility of fastening the battery housing to the vehicle from the vehicle body side.

In order to ensure the leak-tightness of the fastening region, a seal can be arranged between a collar of the screw connection acting against the outside of the plate and the plate, so that the screw connection is protected from any environmental influences. Such a seal can be implemented via a sealing compound, a solid seal, or also an adhesive bond. Corrosion problems in the screw connection are thus avoided. A seal is arranged between the end face of the spacer, which supports the plate on the inside, and the plate. It can be provided here that the end face has a groove into which the seal, for example an O-ring, can be inserted. Due to this embodiment, presuming the connection between the base part and the cover part is also gas-tight, the battery housing can be designed to be gas-tight in the region of the spacer supports despite an opening introduced therein.

In one embodiment of such a battery housing, the spacer and the base plate and/or the cover plate are manufactured from the same material. This does not mean that these elements are produced from identical material, but that they belong to a material group, for example, these parts are steel components. This is advantageous in terms of avoiding galvanic corrosion and also provides advantages in joining.

BRIEF DESCRIPTION OF THE DRAWINGS

The present disclosure is described below by way of example with reference to the accompanying figures, wherein.

DETAILED DESCRIPTION

Figure 1:
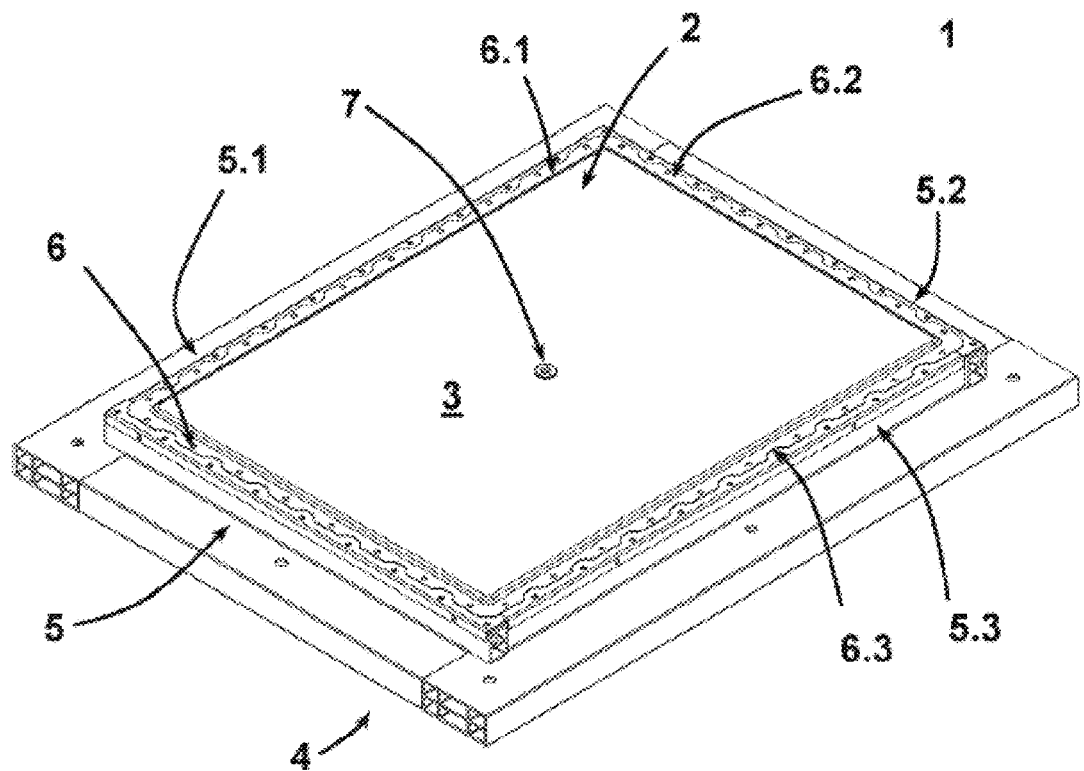
FIG. 1 shows a perspective view of a closed battery housing having a bottom part and a cover part.

FIG. 1 shows a battery housing 1 whose longitudinal extension and transverse extension are significantly greater than its height extension. The battery housing 1 has a relatively large planar extension, for example it can be 1×2 m. The battery housing 1 has a cover part 2. The cover part 2 comprises a cover plate 3, which extends as a base area of the battery housing 1 in one plane. The cover part 2 is attached to a base part 4. The base part 4 comprises side walls 5, 5.1, 5.2, 5.3 and a base plate (not visible in FIG. 1). The side walls 5, 5.1, 5.2, 5.3 are provided by a housing frame produced from individual extruded profile parts. The cover part 2 is circumferentially connected at its edges 6, 6.1, 6.2, 6.3 by screws to the side walls 5-5.3. In addition, the cover plate 3 is supported in its center in relation to the base plate by means of a spacer (not visible in FIG. 1). The cover plate 3 is connected to the spacer by means of a fastening 7. This spacer can be embodied in different ways. Several configurations of such a support on the base part 4 or the cover part 2 are presented below in different embodiments by way of example.

Figure 2:
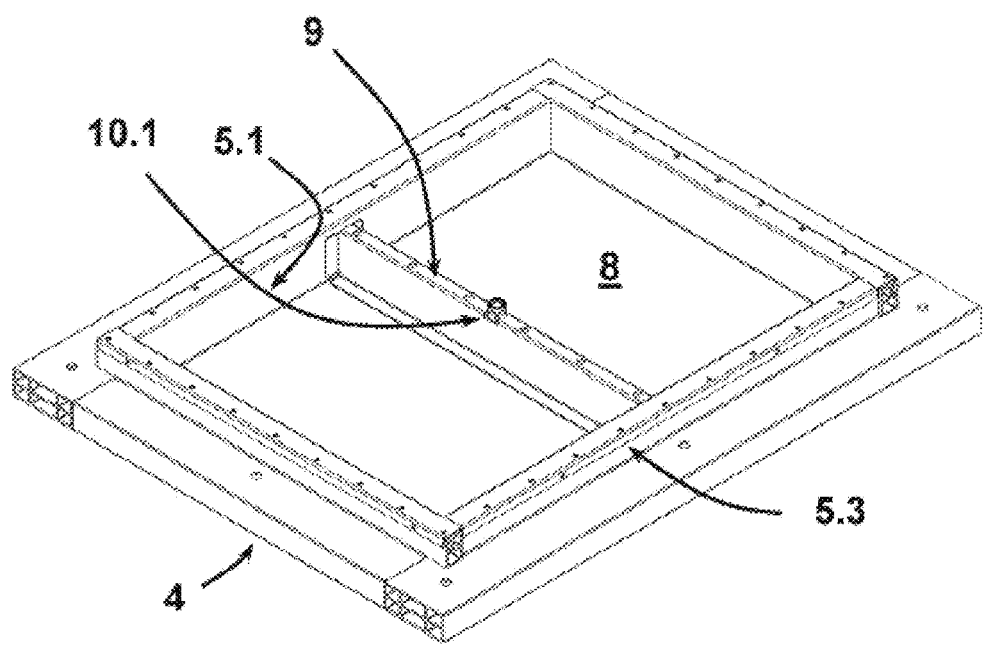
FIG. 2 shows the battery housing of FIG. 1, with the cover part removed.

FIG. 2 shows the battery housing 1 of FIG. 1 with the cover part 2 removed. The base plate 8 of the base part 4 can be seen, which, like the cover plate 3, extends flatly as the base area of the battery housing 1 in one plane. The space that is enclosed by the battery housing 1 when the cover part 2 is assembled with the base part 4 is referred to as the accommodation volume, into which battery modules (not shown in the figures) are insertable. In addition, a cross strut 9 connecting the side walls 5.1, 5.3 is arranged in the base part 4. A spacer element 21 is inserted into the cross strut 9 and supports the cover plate 3. The cross strut 9 is connected to the base plate 8 by a joint, typically spot welds on the base plate 8, with a respective outwardly projecting support flange. In this embodiment, the spacer 10.1 is formed by the cross brace 9 in conjunction with the spacer element 21.

Figure 3:
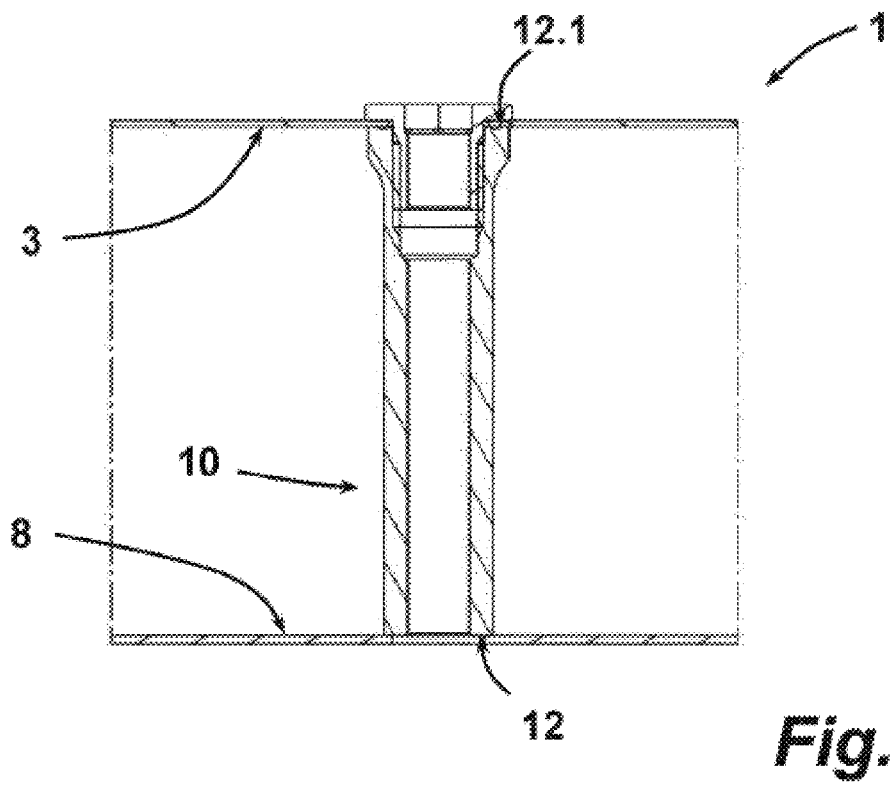
FIG. 3 shows a sleeve-shaped spacer which is attached to the battery housing in the lower region by a welded connection and in the upper region by means of a screw connection.
Figure 4:
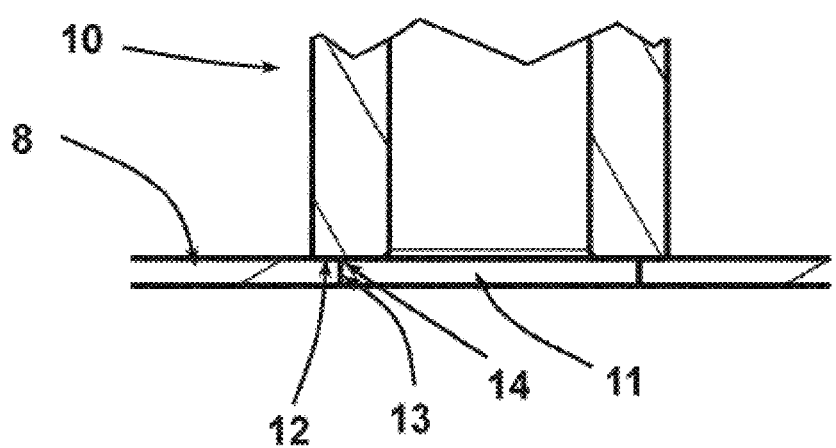
FIG. 4 shows a detailed representation of the welded connection of the spacer fastened on the base plate of the battery housing in FIG. 3.

A spacer 10 is shown in detail in FIG. 3. The sleeve-shaped spacer 10 is spaced apart from the side walls 5, 5.1, 5.2, 5.3 of the battery housing 1 and is located within the accommodation volume, specifically in the illustrated embodiment in the center of the accommodation volume. In this embodiment, the spacer 10 is a sleeve-shaped body that is welded to the base plate 8 (see detailed view of FIG. 4) and screwed to the cover plate 3 (see detailed view of FIG. 5). At both positions, the spacer 10 stands on the inside of the respective plate 3, 8 with part of its end face formed by its material. The cross strut 9 is not shown in this figure or in FIGS. 4 and 5 for the sake of clarity.

In the region in which the spacer 10 is arranged on the base plate 8, the base plate 8 has an opening 11. This opening 11 has a smaller diameter than the outer diameter of the end face 12 of the spacer 10. The inner diameter of the sleeve-shaped spacer 10 is, however, smaller than the diameter of the opening 11. In this way, part of the end face 12 formed by the material of the spacer 10 is supported on the base plate 8. Due to the smaller inner diameter of the spacer 10 in relation to the diameter of the opening 11, the end face 12 partially projects into the opening 11 in the radial direction. The end face 12 remains in the plane of the support here. The alignment of the lateral surface 13 of the opening 11 is thus located within the annular end face 12 of the spacer 10.

This arrangement makes it possible to move the spacer 10 in the plane of the base plate 8 during assembly, so that tolerance inaccuracies with respect to the diameter or the position of the opening 11 in relation to the position of the spacer 10 can be compensated for. The amount of movement in order to maintain a circumferential support and a circumferential projection with respect to the opening 11 depends on the material thickness and the diameter of the spacer 10. A circumferential fillet 14 is formed in relation to the lateral surface 13 of the opening 11 by the projecting end face 12. This fillet 14 is used in this embodiment to provide a fillet weld seam. In order to ensure the leak-tightness of the weld seam, in particular MIG, MAG, or laser welding methods may be used as welding methods. The weld seam is carried out circumferentially. The fillet 14 ensures the formation of a secure, in particular circumferential, sealed welded connection, without negatively affecting the inner or outer lateral surface of the spacer 10. This is of interest with respect to the inner lateral surface of the spacer 10 if the sleeve channel is to be used for a screw connector to reach through. During laser welding, the fillet weld does not protrude in the direction of the longitudinal extension of the spacer 10, so that the head of a screw connector can be brought into contact circumferentially in a planar manner at the edge regions of the opening 11 of the base plate 8 on the outside of the base plate 8.

Figure 5:
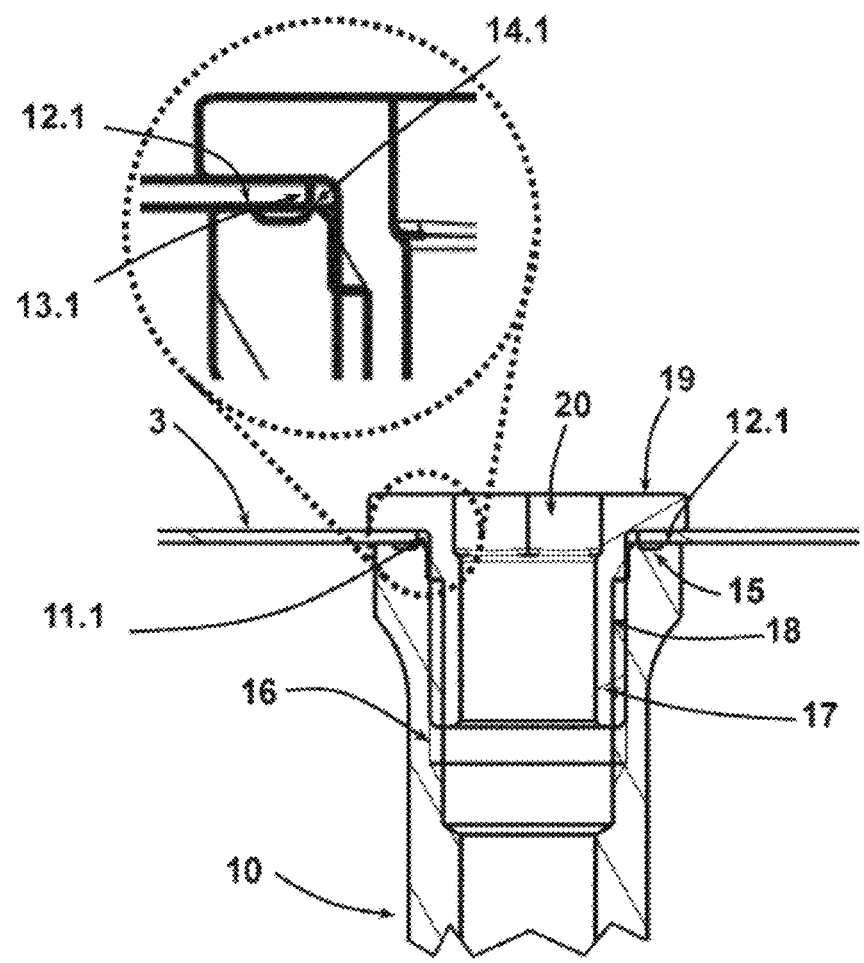
FIG. 5 shows a detailed representation of the screw connection of the spacer fastened on the cover plate of the battery housing in FIG. 3.

The screwed fastening of the spacer 10 on the cover plate 3 shown in FIG. 5 is constructed with the same concept as described above with respect to support: The end face 12.1 of the spacer 10 opposite to the end face 12 also supports the cover plate 3 with only part of its entire end face. In this embodiment, in order to ensure leak-tightness between the spacer 10 and the cover plate 3, a ring seal (not shown in greater detail) is arranged between the end face 12.1 and the inside of the cover plate 3 and is inserted into a groove-like depression 15 of the end face 12.1. Due to the projection of the end face 12.1 beyond the lateral surface 13.1 of the opening 11.1, a fillet 14.1 corresponding to the fillet 14 is also formed at this connection.

An internal thread 16 is introduced into the spacer 10 at this end, into which a screw sleeve 17 is screwed as an example screw connector. The screw sleeve 17 has an external thread 18 complementary to the internal thread 16. The screw sleeve 17 also has a collar 19 acting against the outside of the cover plate 3. By means of the arrangement of the end face 12.1 of the spacer 10, the internal thread 16, and the external thread 18 of the screw sleeve 17 and its collar 19, the spacer 10 is connected to the cover plate 8. This connection is gas-tight due to the seal arranged between the end face 12.1 and the cover plate 3. Instead of arranging the seal on the inside of the cover plate, or in addition thereto, a seal can also be arranged between the collar 19. Then it is an external seal. For screwing in the screw sleeve 17, the screw sleeve 17 has a hexagon socket 20 as a rotary driver contour, as a result of which a rotary movement can be transmitted to the screw sleeve 17 by means of a wrench that fits into the hexagon socket 20.

Like the spacer 10, the screw sleeve 17 has a channel extending through it. Thus, a threaded bolt, which has already been mentioned above and is not shown in detail, for fastening the battery housing 1 on a vehicle can also be inserted through this component.

This structure enables the cover part 2 to be dismantled from the base part 4 in a simple manner, which is important in particular in the context of maintenance of the battery modules accommodated in the battery housing.

Figure 6:
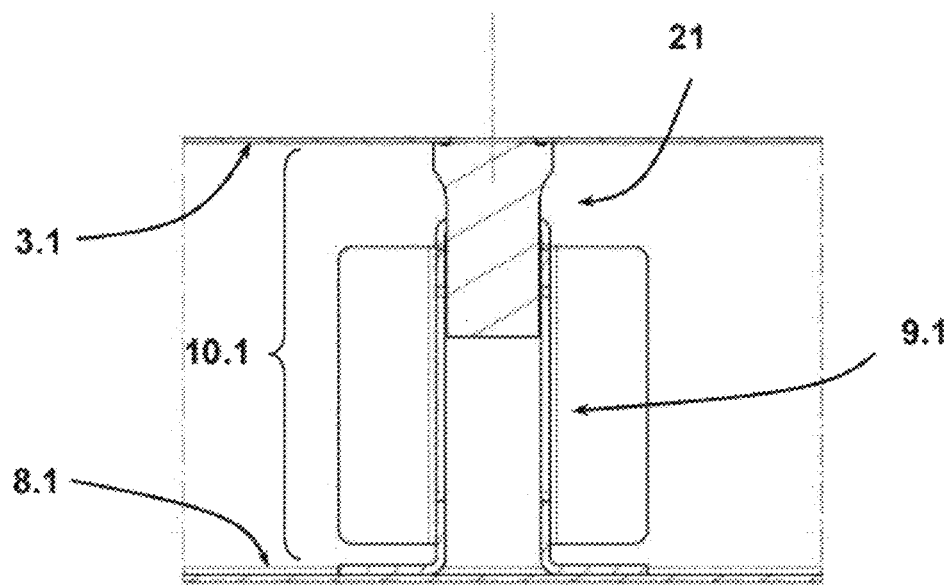
FIG. 6 shows a spacer according to a further embodiment, which is fastened by a cross strut located in the accommodation volume of the battery housing and a spacer element.

In another embodiment of the embodiment described above, according to FIG. 6, the spacer 10.1 is provided by a cross strut 9.1 and a spacer element 21 attached thereon. In this case, the spacer element 21 is fastened on the cross strut 9.1 by means of a weld. The plate-side attachment of the spacer element 21, which is to the cover plate 3.1 in the depicted example, takes place in accordance with one of the above-described configurations. This spacer 10.1 is supported on the base plate 8.1 with support legs of the transverse strut 9.1 projecting outward.

The invention has been explained on the basis of example embodiments. Without departing from the applicable scope of protection, described by the claims, numerous further embodiments and possibilities for implementing the subject matter of the invention are apparent to a person skilled in the art, without these having to be explained or shown in more detail within the context of this disclosure.

LIST OF REFERENCE SIGNS 1 battery housing
2 cover part
3 cover plate
4 base part
5-5.3 side walls
6-6.3 edge of the cover part
7 fastening to spacer
8 base plate
9 cross strut
10, 10.1 spacer
11, 11.1 opening
12, 12.1 end face
13, 13.1 lateral surface of the opening
14, 14.1 fillet
15 depression
16 internal thread
17 screw sleeve
18 external thread
19 collar
20 hexagon socket
21 spacer element

The invention claimed is:

1. A battery housing for a motor vehicle, comprising:
a base part having a base plate and a cover part having a cover plate, wherein the base part and the cover part delimit an accommodation volume for accommodating at least one battery module, and wherein the two base and cover plates are spaced apart by at least one spacer which is arranged inside the accommodation volume and supported on both the base and cover plates,
wherein the spacer is supported with an end face thereof on at least one plate of the two base and cover plates, and the plate has an opening in a region of this support,
wherein the end face of the spacer extends circumferentially over an edge of the opening projecting radially inwards in a plane of the support of the end face on the plate,
wherein the spacer has an internal thread introduced into the end face and the spacer is fastened on the plate using a screw connection, the screw connection engaging in the internal thread and acting against an outside of the plate, and
wherein a seal is arranged between the end face of the spacer and an inside of the plate.

2. The battery housing of claim 1, wherein the spacer is a sleeve body.

3. The battery housing of claim 1, wherein the end face of the spacer is connected by material bonding to a lateral surface of the opening.

4. The battery housing of the claim 1, wherein the screw connection comprises a sleeve having an external thread which engages with the internal thread of the spacer, and the sleeve has a collar which acts against the outside of the plate.

5. The battery housing of claim 4, wherein the sleeve is an internally threaded sleeve.

6. The battery housing of claim 1, wherein a seal interposed between the plate and the screw connection acting against the outside of the plate.

7. The battery housing of claim 1, wherein the opening of the plate has a geometry corresponding to a cross-sectional geometry of the end face of the spacer.

8. The battery housing of claim 1, wherein the accommodation volume is circumferentially sealed leak-tight.

9. The battery housing of claim 8, wherein the accommodation volume is circumferentially sealed gas-tight.

10. The battery housing of claim 1, wherein the spacer is made of the same material as the plate.

11. The battery housing of claim 1, wherein part of the spacer is a strut inserted into the base part or into the cover part having at least one spacer element attached thereon.

12. The battery housing of claim 1, wherein the seal is a ring seal arranged in a groove formed in the end face of the spacer.

* * * * *